Sept. 14, 1965  P. J. HAAG  3,206,262
SEAL FOR MINIATURE BEARING
Filed July 8, 1963
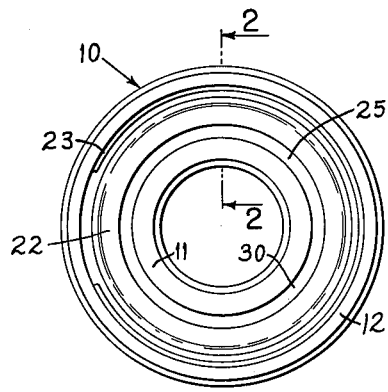
FIG_1
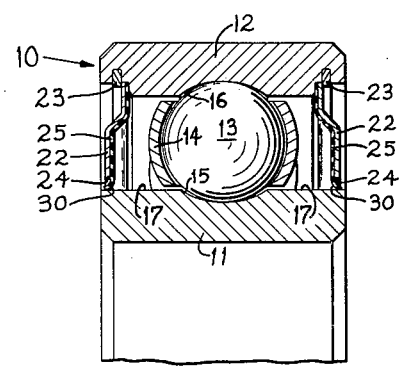
FIG_2
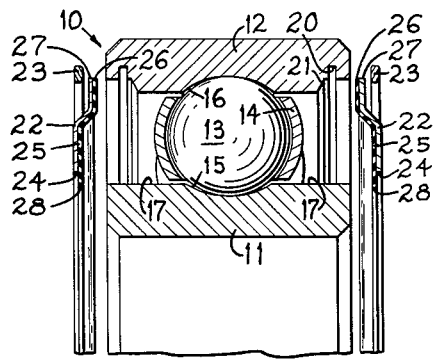
FIG_3
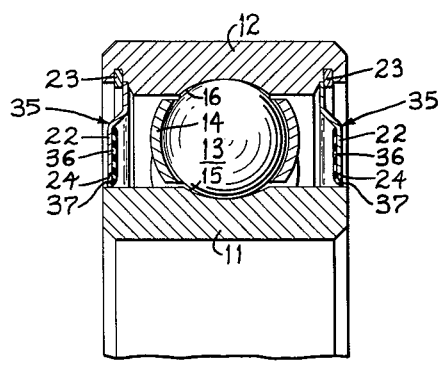
FIG_4
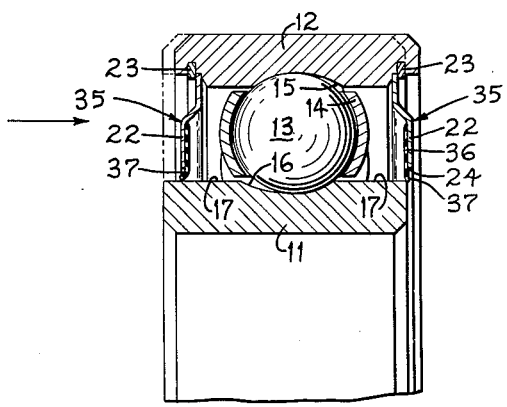
FIG_5
INVENTOR.
PAUL J. HAAG
BY *A. Donlan Owen &
Robert E. Wickersham*
ATTORNEYS

United States Patent Office 3,206,262
Patented Sept. 14, 1965

3,206,262
SEAL FOR MINIATURE BEARING
Paul J. Haag, Long Beach, Calif., assignor to Federal-Mogul-Bower Bearings, Inc., Detroit, Mich., a corporation of Michigan
Filed July 8, 1963, Ser. No. 293,344
1 Claim. (Cl. 308—187.2)

This invention relates to an improvement in seals for miniature anti-friction bearings.

Special problems develop when working with very small anti-friction bearings and in attempting to seal them to protect them from entry of foreign matter and from exit of lubricant. The outer diameter of such miniature ball bearings typically lies in the range of about 1/8" to 1 1/2", and their bore size lies in the range of about 1/20" up to about 5/8". The clearance between the two bearing races is quite small—rarely being as great as 1/8" and more typically 1/16" and often even less. Due to these small sizes, the problems are quite different from those met in larger bearings.

For example, the torque exerted by a sealing member becomes a very serious factor in small bearings. The best seals heretofore in use have increased the torque on miniature ball bearings by at least 15, and more often by 50 to 100 times. just by the frictional contact between the seal lip and the bearing race. This is in marked contrast to normal-sized ball bearings where the torque added by a light sealing member presents no serious problem. But the torque in a 3/8" miniature ball bearing without a seal is in the order of .001 to .002 inch-ounces, typically about 1000 milligram-millimeters.

In miniature bearings the torque caused by the sealing members alone has often required them to be omitted. On the other hand, omission is hardly safe, for many miniature bearings operate in closed assemblies for long periods of time, and the presence of lubricant is quite essential. In many installations it is not possible to locate the bearing in a place where it can be relubricated. It must carry its own lubricant and loss thereof cannot be recompensed. A very light grease or a light instrument oil is the usual lubricant, and they will very gradually migrate out of the bearing if there is no seal whatever. Moreover, the exclusion of ever microscopic foreign matter is quite important for these miniature bearings, since even small abrasive particles that reach the bearing race soon abrade the bearing surfaces, cause excessive wear, and necessitate replacement. The tolerances used in these bearings are very small indeed; a typical example is that the land of the bearing race is normally held to a tolerance within 0.0002", and the internal clearance between the balls and race is held in the same order. The entry of specks of dust can cause abrasion and premature failure and with such small tolerances as this, if the particles are larger than .0002" they can actually cause temporary seizure as they pass between the balls and races.

Due to the torque problem presented by seals, most miniature bearings have generally been protected only by metal shields that are locked into a groove in the outer race by a wire snap ring. Such shields merely reduce the amount of space available for foreign matter to enter; they are practically worthless for retaining lubricant and are rarely satisfactory even for preventing entry of foreign matter since dust can enter through the clearance of 0.003 to 0.005" between the edge of the shield and the edge of the land it faces.

Various types of seals have been tried in attempts to solve these problems. One of the better ones has been a type of face seal in which a resilient diaphragm-like ring of low-friction elastomer mounted in the outer race rubs against a radial metal face on the inner race. While this has sometimes been satisfactory it has an inherent defect in that miniature ball bearings have their races ground to a larger radius than the radius of the balls, and the bearing contact angle, which is affected by the initial radial play and by the radii of curvature, usually results in lateral displacement of the two races to each other along the axis of the bearing by an amount which is large enough to affect such face-type diaphragm seals. On one end of the bearing the seal diaphragm will be flexed out much farther than it should be, increasing its torque as well, and on the other side the seal will be lost unless the diaphragm has some means such as a large inherent resiliency to force it to follow the face as the latter moves in the opposite direction.

Moreover, the materials used for seals heretofore have introduced a good deal of torque and some of them have also caused other problems. Many of these prior-art seals for miniature bearings have employed a core of fiberglass to support a body of tetrafluoroethylene, and some of them add dry lubricants or other fillers. The sealing diaphragm has been a rather stout ring of fiberglass impregnated with tetrafluoroethylene carrying a dry lubricant. The trouble has been that some glass fiber particles have worn off and been introduced into the bearing where they tended to introduce wear; the filling materials have also tended to introduce wear. Moreover, dust, grease and various microscopic abrasive particles which tend to get into the seal during its manufacture cannot effectively be cleaned off from these materials, for the solvents that would clean them off tend to eat into such seals and even to set free some of the more damaging particles in the seals while also tending to cause rough edges.

The present invention involves a very precise type of relationship between the seal and the bearing, and the use of very thin unreinforced and unfilled tetrafluoroethylene in a lip-type sealing member. The pure tetrafluoroethylene is sufficiently self-lubricating to run dry and when used in the pure unfilled state as a lip-type seal, according to the principles of this invention, possesses very unusual properties which have not, so far as I know, heretofore been found.

In the drawings:

FIG. 1 is a greatly enlarged end view of a miniature ball bearing incorporating seals embodying the principles of this invention.

FIG. 2 is a further enlarged view in section taken along the line 2—2 in FIG. 1.

FIG. 3 is a view like FIG. 2 showing the seals before installation.

FIG. 4 is a view similar to FIG. 2 showing a modified form of the seal.

FIG. 5 is a view similar to FIG. 4 showing the outer race member displaced relatively from the normal position indicated in broken lines.

The views are considerably enlarged, and unless this fact is borne in mind misleading comparisons may be drawn.

The miniature ball bearing 10 of FIG. 1 has much in common with a typical ball bearing, but there are important differences. Like other ball bearings, the bearing 10 has an inner race member 11, an outer race member 12, a ring of balls 13, and a cage 14. However, all of these parts are vary precisely made to very close tolerances, and the arcuate surfaces 15, 16 of the inner and outer race members 11 and 12 are ground to a larger radius than are the balls 13, often resulting in axial offset of the race members 11, 12 (see FIG. 5) due to the consequent contact angle, when the two races 11, 12 are moved in opposite axial directions.

The inner race 11 has a smooth cylindrical land 17 at each end, which is very precisely sized to a tolerance ordinarily of 0.0002". The outer race 12 is provided, as is conventional, with annular groove 20 and an annular shoulder 21 (see FIG. 3) that receive a metal shield 22 and a split retaining wire 23. The shield 22 is typically made from steel only 0.005" thick and is preferably bent to the offset shape shown, and the wire 23 is even thinner and is made of spring steel so that it can be snapped into place in the groove 20 and hold the shield 22 against the shoulder 21. The inner periphery 24 of the shield 22 is left to clear the land 17 by 0.003" to 0.005", and heretofore this space has been left open—or else the shield has been replaced by a sealing member which has usually sealed against a radial face on the race.

In the present invention the shield 22 is shaped as usual but is even thinner than usual, preferably having a thickness of 0.004", and it is used functionally as a reinforcing or supporting ring to which is bonded (in the form of the invention shown in FIGS. 1–3) an annular membrane 25 of very thin paper-like polytetrafluoroethylene only 0.002" thick, approximately. When compressed against the shoulder 21 it yields and flows somewhat, due to its elastomeric properties, and therefore, the assembly of the shield 22 and sealing membrane 25 can be put into the same space as that ordinarily used by the ordinary shield. The outer periphery 26 of the sealing annulus 25 is preferably the same as the outer periphery 27 of the shield, but the annular membrane 25 extends radially inwardly to an inner periphery beyond the inner periphery 24 of the supporting shield.

Before the tetrafluoroethylene member 25 is bonded to the metal shield 22, at least the inner periphery 24 of the shield is punched out exactly to the correct size. The shield's outer periphery 27 may still be rough, and both peripheries 26 and 27 may be cut to size after bonding; if desired, a concentric punch may simultaneously trim the inner periphery 28 of the sealing membrane 25 to the exact size, or the inner periphery 28 may be punched out later; the membrane 25, in fact, may be a disc when bonded to the metal ring 22. In any event, its inner periphery 28 is punched out to be concentric with the inner periphery 24 of the metal ring 22 and to the outer peripheries 26 and 27, the concentricity being maintained within a tolerance no greater than 0.001". Moreover, it is precisely punched to provide a precise interference with the land 17; that is, the diameter of the membrane 25 is smaller than the diameter of the land 17 by 0.003" to 0.005". Or, considering radius instead of diameter, the radius of the inner periphery 28 of the tetrafluoroethylene membrane 25 is smaller than the radius of the land 17 by .0015" to .0025". This causes the annular portion 30 between the inner periphery 24 of the metal and its own inner periphery 28 to flex and curl, as shown in the drawings, and to function as a sealing lip.

Due to the thinness of the tetrafluoroethylene membrane 25 and to the precise amount of interference of the portion 30 with the land 17 and to the support by the metal ring 22 of all except the portion 30, the torque can be held very low in comparison with prior-art seals—about ten times as good or better. For the torque of my new seal is only about five times the torque of the bearing 10 without the seal 25, whereas prior art seals usually increased the torque from 50 to 100 times, and even more. Furthermore, since according to this invention the concentricity is maintained very accurately the torque is evenly distributed, and this is itself very important. The closeness of the shield 22 to the land 17 helps to support the lip 30 so that leakage of lubricant from the bearing is held to a minimum, and the dirt exclusion properties of the seal are quite excellent.

For example, a ball bearing 10 having a ⅜" outer diameter incorporating the present invention was made for use in a pinch roller driving magnetic tape, where the iron oxide (which comes off from the tape quite freely) has heretofore been able to work its way into the bearings and abrade them. The abrasion problem had been so great that no satisfactory bearing life had been obtainable. However, a bearing using a seal of the present invention was run for over 600 hours on a continuous stop-start basis of up to 300 starts per second, and after this strenuous test careful examination of the bearings showed no sign whatever of wear or contamination, and the only sign of any loss of lubricant was a little dust that had collected around the outside of the bearing. The results were very significant, because when other seals were used, the same bearing had previously been disqualified for either excessive torque or for lack of effective sealing, but the present invention resulted in its immediate qualification. A shielded but unsealed bearing could not be used because of the very strenuous abrasion problem.

Another very important relationship in this invention is that of the expansion rate of tetrafluoroethylene as compared with steel. Tetrafluoroethylene expands under heat about 10 times as much as steel. When the bearing and seal are made according to this invention, the heat generated by friction on the land 17 tends to cause the membrane portion 30 to move radially outwardly, thereby *lowering* the torque on the land 17 and consequently reducing the heating action; in fact if heated enough, the membrane portion 30 actually lifts off the land 17 a microscopic amount, losing contact temporarily long enough to cool itself. However, the lifting is so microscopically small that it does not apparently enable the passage of lubricant. This fact has been shown by test. In no instance so far has the seal admitted foreign matter into the bearing.

Another very important feature of this invention is that the seal can be thoroughly cleaned from foreign matter before installation. The seal comprises only the steel ring 22 and the tetrafluoroethylene membrane 25 bonded to it, and it can be readily cleaned because these materials are quite resistant to the necessary cleaning chemicals. For example, trichlorethylene at pH 7 and dichlorodifluoromethane and other organohalides have been used as cleaning solvents, several solutions being used in succession to get rid of as much microscopic dirt as can be gotten rid of. After several rinses, the seal is clean, and its integrity is by no means affected; whereas, seals made from other materials or filled with dry lubricants or supported by glass fiber were adversely affected by these cleaning agents and tended to introduce into the bearing abrading matter coming from the disintegration of the seal.

A modified form of seal 35 of the invention is shown in FIG. 4. In this seal 35 the tetrafluoroethylene ring 36 is confined to the inner radial portion of the shield 22 and to a lip portion 37 but does not extend to the outer periphery 27 of the shield 22. This seal 35 is somewhat cheaper, but it is also somewhat less satisfactory because it is not as effective a lubricant seal at the outer periphery. However, it does have the same advantages at the inner periphery, and they are considerable.

Moreover, as shown by FIG. 5, the seal 35 continues to seal in exactly the same manner and with the same sealing characteristics even if the two race members 11 and 12 are relatively displaced to the maximum amount afforded by their contact angle. The seal of FIGS. 1–3 acts in the same way, but seals relying on the contact of two radial faces are seriously affected by such shifting: one set of faces would have its torque greatly increased, and the other set of faces would tend to lose its ability to seal. In contrast the present invention enables the continuity of the seal with no change in torque.

To those skilled in the art to which this invention relates, many additional changes in construction and widely differing embodiments of the invention will suggest themselves without departing from the spirit and scope of the invention as defined in the claims.

What is claimed is:

A sealed miniature ball bearing, including in combination:

an inner race having a first arcuate race groove and a cylindrical land whose diameter is kept to a tolerance within 0.0002",
an outer race having a second arcuate race groove like that of said inner race and a sealing member receptacle with a shoulder on the side closer to said second race groove,
a ring of balls between said races in said race grooves and having a radius smaller than that of said race grooves, so that said bearing has a contact angle enabling axial offset of said inner and outer races,
a sealing device comprising an annular membrane of 0.002" thickness, approximately, tetrafluoroethylene bonded to an annular reinforcing ring of 0.0004" thickness reinforcing metal on the side of said metal facing said balls, the outer periphery of said sealing device being in said sealing member receptacle, and
a locking ring in said sealing member receptacle holding said sealing device against said shoulder,
the inner periphery of said reinforcing ring having a radial clearance from said land of 0.003" to 0.005", the inner periphery of said membrane having a diametral interference with said land of 0.003" to 0.005".

References Cited by the Examiner

UNITED STATES PATENTS

| | | | |
|---|---|---|---|
| 2,310,607 | 2/43 | Batesole | 308—187.2 X |
| 2,375,166 | 5/45 | Cooper | 208—187.2 X |
| 2,701,732 | 2/55 | Van Dorn | 308—187.2 X |
| 2,734,757 | 2/56 | Ritchey | 308—187.2 X |
| 2,766,082 | 10/56 | Martin | 308—187.2 |
| 2,850,792 | 9/58 | Cobb | 308—187.2 X |
| 2,856,246 | 10/58 | Gaubatz | 308—187.2 |
| 2,962,912 | 12/60 | Hirschle | 308—189 X |

DON A. WAITE, *Primary Examiner.*
ROBERT C. RIORDON, *Examiner.*

UNITED STATES PATENT OFFICE
CERTIFICATE OF CORRECTION

Patent No. 3,206,262 September 14, 1965

Paul J. Haag

It is hereby certified that error appears in the above numbered patent requiring correction and that the said Letters Patent should read as corrected below.

Column 1, line 44, for "ever" read -- even --; column 2, line 64, for "vary" read -- very --; column 3, line 41, for "periphery" read -- pierce --; column 5, line 13, for "0.0004"" read -- 0.004" --.

Signed and sealed this 5th day of July 1966.

(SEAL)
Attest:

ERNEST W. SWIDER
Attesting Officer

EDWARD J. BRENNER
Commissioner of Patents